United States Patent [19]

Rastogi et al.

[11] 4,018,482
[45] Apr. 19, 1977

[54] RIM CONSTRUCTION FOR WHEELS HAVING BRAKE TORQUE DRIVES

[75] Inventors: Vijay Rastogi, Akron; James Michael Budd; Daniel Lynn Koehler, both of Troy, all of Ohio

[73] Assignee: The B. F. Goodrich Company, Akron, Ohio

[22] Filed: June 19, 1975

[21] Appl. No.: 588,178

[52] U.S. Cl. .................................................. 301/6 E
[51] Int. Cl.[2] ........................................ B60B 21/08
[58] Field of Search ................ 301/6 R, 6 A, 10 R, 301/10 DC, 6 E; 188/71.5, 213; 192/109 R, 70.16

[56] References Cited
UNITED STATES PATENTS

| | | | |
|---|---|---|---|
| 2,925,889 | 2/1960 | Albright | 188/71.5 |
| 3,482,654 | 12/1969 | Abu-Akeel | 192/70.16 |
| 3,772,940 | 11/1973 | Ohtsuka | 188/71.5 |
| 3,836,201 | 9/1974 | Stimson et al. | 301/6 E |

*Primary Examiner*—Stanley H. Tollberg
*Attorney, Agent, or Firm*—W. A. Shira, Jr.; F. K. Lacher

[57] ABSTRACT

A rim for a wheel and brake assembly having a lug on the radially inner surface integral with the rim and positioned for torque transmission between axially slidable brake members and the rim. The lug has an inner face spaced from the radially inner surface of the rim and is recessed at a position along the lug with the thickness of the lug at the recess being less than at other positions along the lug to reduce the stresses in the lug and rim.

9 Claims, 5 Drawing Figures

U.S. Patent    April 19, 1977    4,018,482
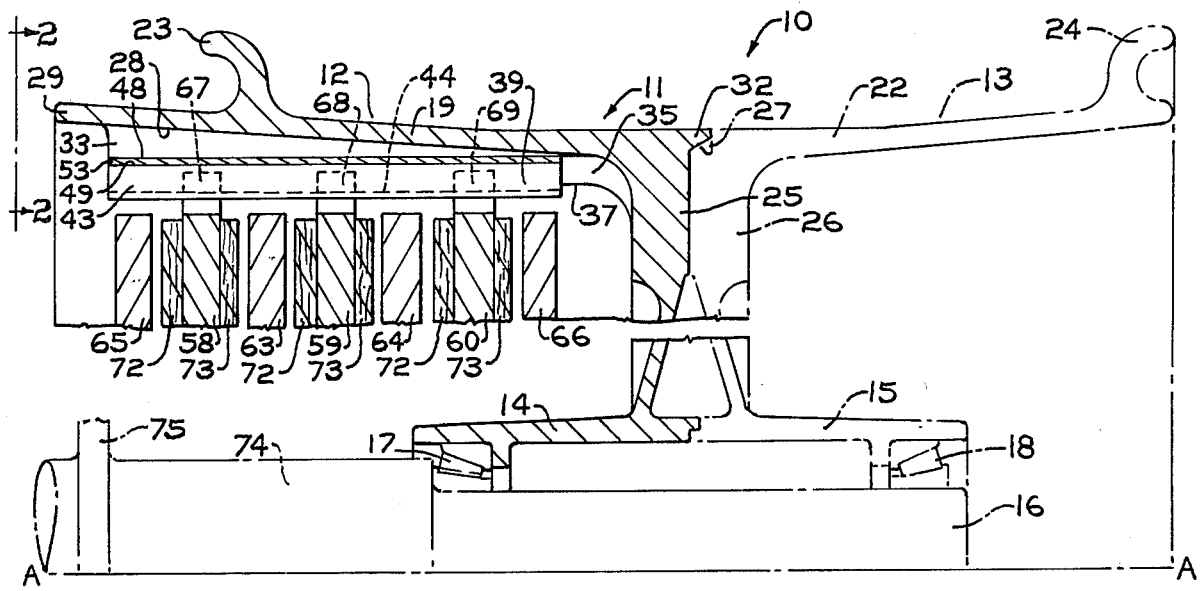
FIG.1
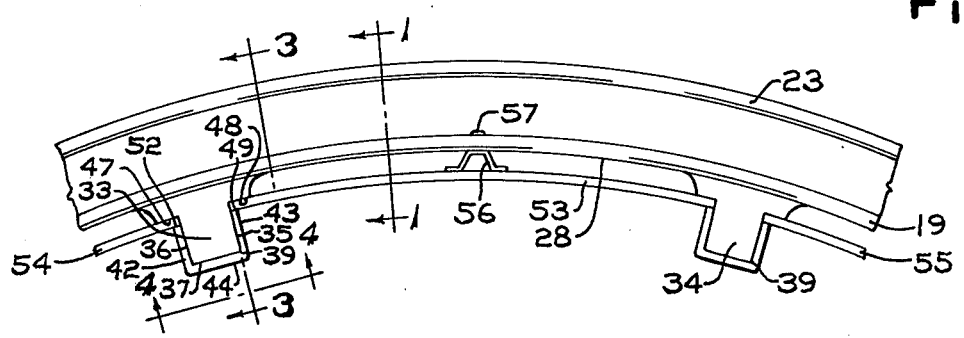
FIG.2
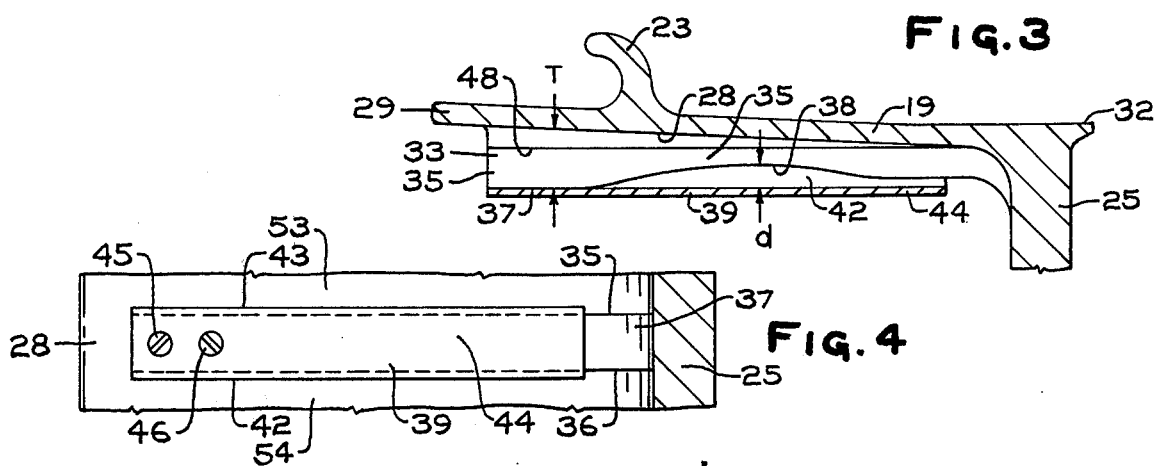
FIG.3
FIG.4
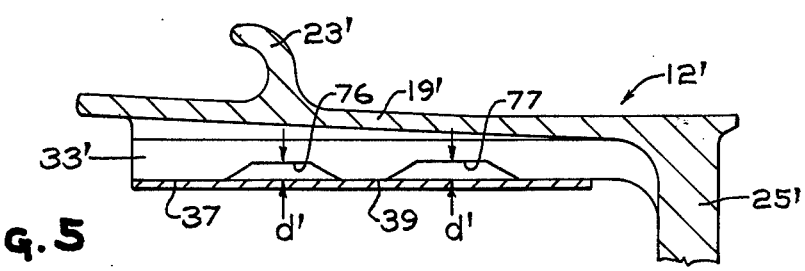
FIG.5

4,018,482

RIM CONSTRUCTION FOR WHEELS HAVING BRAKE TORQUE DRIVES

BACKGROUND OF THE INVENTION

This invention relates to disc type brakes or clutches and particularly to the torque-transmitting members fastened to the wheel for engagement with the rotors. Separate rotor drive keys have been fastened to the wheel and rim; however, these have been replaced by integral lugs on the radially inner surface of the rim because an appreciable savings in weight can be obtained. Use of integral lugs has decreased the weight of the brake and wheel assembly; however, it has also changed the stress distribution in the rim. Tensile stresses in the surface of the integral lugs have exceeded desirable maximums in operation causing premature failures due to fatigue stresses and reducing the load which can be carried by the rim. Failures with integral lugs have also occurred in the rim at the tire supporting flange where the tire bead is retained and consequently this has increased the hazards resulting from failure.

SUMMARY OF THE INVENTION

According to this invention, a rim construction is provided with integral torque-transmitting lugs in which each of the lugs is contoured to lower the maximum tensile stresses in the lugs and rim below the maximum desired stress level. The end moments and shear forces imposed at the rim edge are also rapidly damped with lugs of this contour. Furtheremore, the lug contour is such that the highest stress point and most likely location for failure is spaced from the rim flange and tire bead at a location where failure results in the minimum damage and risk. This improvement is obtained without adding any weight and may include a channel-shaped keyway fastened to and overlying the lug providing torque-transmitting engagement with the axially slidable brake or clutch member.

The accompanying drawings show one preferred form and a modification made in accordance with and embodying this invention and are representative of how this invention may be practiced.

BRIEF DESCRIPTION OF THE DRAWINGS

In the drawings:

FIG. 1 is a partial sectional view taken along the plane of line 1—1 of FIG. 2 of a wheel and brake assembly with the axle and one-half of the wheel being shown in chain-dotted lines and parts being broken away.

FIG. 2 is a fragmentary axial elevational view of the rim and two lugs taken along the plane of line 2—2 in FIG. 1.

FIG. 3 is a fragmentary sectional view of the rim and a lug taken along the planes of line 3—3 in FIG. 2.

FIG. 4 is a radial view of the lug taken along the plane of line 4—4 in FIG. 2 showing the keyway fastened to the lug.

FIG. 5 is a fragmentary sectional view like FIG. 3 of a modification of the invention.

DETAILED DESCRIPTION

Referring to FIG. 1, a wheel and brake assembly 10 is shown in which a wheel 11 has an inboard half 12 and an outboard half 13 which may be bolted together by bolts and nuts (not shown) spaced around the wheel in a manner well known in the art. The wheel 11 has hub members 14 and 15 rotatably mounted on an axle 16 carrying bearings 17 and 18 interposed between the axle and hub members. The axle 16 has an axis A—A about which the wheel and brake assembly 10 is rotated.

The wheel halves 12 and 13 include rims 19 and 22, respectively, on which tire supporting flanges 23 and 24, respectively, are mounted for engaging the bead portions of the tire. The halves 12 and 13 have web members 25 and 26, respectively, extending between the hub members 14 and 15 and the rims 19 and 22. A seal 27 may be clamped between the web members 25 and 26 to provide an air-tight chamber within the tire mounted on the rim members 19 and 22.

Rim member 19 of the inboard wheel half 12 has a radially inner surface 28 extending from an inboard or first edge 29 of the rim to an area adjacent the web member 25 or second edge 32 of the rim member. The rim members 19 and 22 are generally cylindrical with an axis which is coaxial with the axis A—A of the wheel and brake assembly 10.

As shown in FIGS. 1 and 2, torque-transmitting lugs 33 and 34 integral with the rim member 19 extend radially inward from the inner surface 28 of the rim member and axially across the inner surface from the first edge 29 towards the second edge 32 of the rim member. The lugs 33 and 34 are located at spaced-apart positions circumferentially of the rim member 19 and since the construction of all of the lugs is the same, the following description will be confined to the lug 33 with the understanding that this applies to lug 34 as well as the other lugs (not shown) around the rim member 19.

The lug 33 is integral with the rim member 19 of the wheel half 12 which may be of forged aluminum. The lug 33 has a rectangular cross section with axially extending parallel side faces 35 and 36. The lug 33 also has a radially extending inner face 37 which extends in a generally parallel relationship to the axis A—A of the wheel and brake assembly 10.

As shown more clearly in FIG. 3, the inner face 37 of lug 33 has a recess 38 at a position along the axial length of the lug which reduces the thickness T of the lug measured between the inner face and radially inner surface 28 of the rim member 19 at the recess. For this embodiment, the lug 33 is approximately 7 inches long and the recess 38 is located at a position approximately four inches from the web member 15. The depth $d$ of the recess at the deepest point is approximately one-quarter of an inch and the length of the recess 38 extends from the web member 25 at a position approximately 5 inches from the web member and at a position radially inward from the tire supporting flange 23. As shown in FIG. 3, the distance from the recess 38 to the first edge 29 and second edge 32 of the rim member 19 is approximately the same and the recess extends to the end of the lug at the web member 25.

A keyway 39 of steel or other wear-resisting material has a U-shaped cross section and overlies the lug 33. The keyway 39 has opposing parallel side members 42 and 43 connected by a base member 44. The keyway 39 is installed on the lug 33 with the side members 42 and 43 in close fitting relationship with the side faces 35 and 36 of the lug and with the base member 44 bearing against at least a portion of the unrecessed inner face 37. Additional fastening means such as screws 45 and 46 may extend through holes in the base member 44 and are threaded into holes in the lug 33.

The lug 33 may have shoulders 47 and 48 adjacent the inner surface 28 of the rim member 19 extending the length of the lugs and providing a surface which is substantially parallel to the axis A—A of the wheel and brake assembly 10. The width of the side members 42 and 43 of the keyway 39 is the same throughout the length of the keyway and the edges 49 and 52 of the keyways are seated on heat shields 53, 54 and 55 of metal or other heat-reflecting material interposed between the edges 49 and 52 of the keyway and the shoulders 47 and 48 of the lug 33. The heat shield 53 extends between the lug 33 and lug 34 and is held in place by the keyways 39 and by a bracket 56 attached to the heat shield and riveted to the rim member 19 as by rivet 57. Since the heat shields 53, 54 and 55 have the same thickness throughout, the edges 49 and 52 of the keyway 39 bottom on a surface which is parallel to the axis A—A of the wheel and brake assembly 10 and accordingly the surface of the base member 44 of the keyway will be parallel to the axis of the wheel and brake assembly.

As shown in FIG. 1, a disc brake having rotatable disc members such as rotors 58, 59 and 60 and nonrotatable disc members such as stators 63 and 64 and end plates 65 and 66 are located between the rim member 19 and the hub member 14. The rotors 58, 59 and 60 have slots 67, 68 and 69 for slidable engagement over the keyway 39. Friction linings 72 and 73 are adherred to the surfaces of the rotors 58, 59 and 60 engagable with the end plates 65 and 66 and the stators 63 and 64.

The axle 16 has a boss 74 carrying a torque flange 75 on which a torque frame and torque tube are supported with the torque tube having spline members for slidable engagement with slots in the stators 63 and 64 and the end plate 65 and 66. The rotors and stators may be urged together in braking engagement by suitable power means such as a hydraulic piston and cylinder assembly mounted in the torque frame and urging the end plate 65 in a direction towards a reaction plate member supporting the end plate 66.

Referring to FIG. 5, a modification of the invention is shown in which the lug 33' has two spacedapart recesses 76 and 77 in the inner face 37'. A keyway 39' is mounted over the lug 33' in a manner similar to that described above for the embodiment of FIGS. 1 through 4. The lug 33' is integral with a rim half 19' which is connected to a web member 25' of a wheel half 12'. A tire supporting flange 23' extends radially outward from the rim half 19' and the recess 76 is located at a position radially inward from the flange. The recess 77 is located between the recess 76 and the connection of the lug 33' with the web member 25'. In the embodiment shown in FIG. 5, the lug 33' is approximately seven inches long and the recess 76 is approximately five inches from the web member 25'. The recess 77 is approximately 3 inches from the web member 25' and both of the recesses have a depth $d'$ of approximately one-quarter of an inch below the inner face 37'. Each of the recesses 76 and 77 is also approximately 1½ inches long and is separated by a distance of approximately ½ inch from the other recess.

Comparative tests with strain gauges mounted along the inner faces 37 and 37' of the lugs 33 and 33' of FIGS. 1 through 5 have shown that the maximum stress levels reached have been reduced by over two thousand pounds per square inch as compared to a rim construction in which the lugs are not recessed at the inner face. This reduction in maximum tensile stress in the inner faces 37 and 37' of the lugs 33 and 33' prevents early fatigue failures resulting from repeated stresses during rolling of the wheel 10 in a loaded condition. It is believed that these improved results are obtained because the reduced stiffness of the lugs 33 and 33' allows the flanges 23 and 23' to carry a larger portion of the load to a greater portion of the rims 19 and 19'.

In addition to the contours shown in FIGS. 3 and 5, other contours may be provided in accordance with the teachings of this invention wherein more recesses having variable depths or one recess having a different contour may be provided to reduce the maximum stress to that stress which will provide the necessary rolling distance for a wheel of the material being used. It is also contemplated that the keyways 39 and 39' may be used with these lugs 33 and 33' of different contours to effectively transfer the torque forces from the rotors 58, 59 and 60 to the rim half 19' and webs 25 and 25' of the wheel halves 19 and 19' in accordance with this invention.

We claim:

1. A rim construction for a wheel and brake assembly in which said rim is generally cylindrical and coaxial with the axis of said wheel and brake assembly and in which said rim has a radially inner surface comprising a torque-transmitting lug integral with said rim extending radially inward from and axially across said inner surface from one end to the other end of said lug, axially extending side faces on said lug for transmitting torque to said rim from brake members of said assembly and a radially inner face of said lug spaced radially inward from said inner surface of said rim by a distance equal to a thickness of said lug, said lug being recessed at a position along the axial length thereof, said thickness of said lug at said position being less than said thickness of said lug at another position spaced apart axially along said lug to reduce the stresses in said lug and rim during operation of said wheel and brake assembly.

2. A rim construction as defined in claim 1 wherein said inner face of said lug is recessed in at least two spaced-apart positions along said lug.

3. A rim construction as defined in claim 1 wherein a first edge of said rim is adjacent a tire flange and a second edge of said rim is adjacent a wheel web member, said lug extending between said tire flange and said web member and said recess being positioned at a position approximately one-half the distance from said first edge to said second edge.

4. A rim construction as defined in claim 3 wherein said recess extends to the end of said lug at said wheel web member.

5. A rim construction for a wheel and brake assembly in which said rim is generally cylindrical and coaxial with the axis of said wheel and brake assembly and in which said rim has a radially inner surface comprising a torque-transmitting lug integral with said rim extending radially inward from and axially across said inner surface, axially extending side faces on said lug for transmitting torque to said rim from brake members of said assembly, a protective keyway with a U-shaped cross section overlying said inner face and said side faces for engagement with said brake members, and a radially inner face of said lug being recessed at a position along the axial length thereof whereby said thickness of said lug measured in the radial direction is reduced at said position to reduce the stresses in said lug and rim during operation of said wheel and brake assembly.

6. A rim construction as defined in claim 5 wherein said keyway has opposing side member and a connecting base member between said side members, said opposing side member overlying said side faces of said lug and said base member having a surface parallel to said axis of said wheel and brake assembly throughout the length of said lug providing continuous generally flat torque-transmitting surfaces for engagement with said brake members at all positions along said lug.

7. A rim construction as defined in claim 5 wherein said lug has a rectangular cross section with said side faces in parallel relationship and said side members of said keyway being in parallel relationship for overlying said side faces of said lugs.

8. A rim construction as defined in claim 5 wherein said lug and said rim are of forged aluminum and said keyway is of steel.

9. A rim construction as defined in claim 6 wherein said base member of said keyway overlies said inner surface of said lug along at least a portion of said lug and further comprising fastening means for connecting said base member to said lug at said portion of said lug.

* * * * *

UNITED STATES PATENT OFFICE
CERTIFICATE OF CORRECTION

PATENT NO. : 4,018,482
DATED : April 19, 1977
INVENTOR(S) : Vijay Rastogi, James Michael Budd, and Daniel Lynn Koehler It is certified that error appears in the above-identified patent and that said Letters Patent are hereby corrected as shown below:

Column 2, line 49 change "member 15" to ---member 25---;
Column 2, line 52, change "at a position" to ---to a position---.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks